(12) United States Patent
Gaikwad et al.

(10) Patent No.: US 11,799,729 B2
(45) Date of Patent: **\*Oct. 24, 2023**

(54) POLICY DRIVEN NETWORK QOS DEPLOYMENT

(71) Applicant: Nicira, Inc., Palo Alto, CA (US)

(72) Inventors: Yogesh Gaikwad, Pune (IN); Amol Kanitkar, Pune (IN); Shreyas Bhatewara, Pune (IN)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,109

(22) Filed: Aug. 21, 2022

(65) Prior Publication Data

US 2022/0400057 A1 Dec. 15, 2022

Related U.S. Application Data

(63) Continuation of application No. 16/569,864, filed on Sep. 13, 2019, now Pat. No. 11,424,985, which is a continuation of application No. 15/490,805, filed on Apr. 18, 2017, now Pat. No. 10,447,541.

(30) Foreign Application Priority Data

Aug. 13, 2016 (IN) .............................. 201641027757

(51) Int. Cl.
*H04L 41/0893* (2022.01)
*H04L 41/0896* (2022.01)
(52) U.S. Cl.
CPC ...... *H04L 41/0893* (2013.01); *H04L 41/0896* (2013.01)

(58) Field of Classification Search
None
See application file for complete search history.

(56) References Cited

U.S. PATENT DOCUMENTS

| 6,700,809 | B1 | 3/2004 | Ng et al. |
| 6,873,602 | B1 | 3/2005 | Ambe |
| 7,382,637 | B1 | 6/2008 | Rathnavelu et al. |
| 7,716,662 | B2 | 5/2010 | Seiden |
| 3,095,115 | A1 | 1/2012 | Groenendaal |

(Continued)

OTHER PUBLICATIONS

Piccolo et al., "A Survey of Network Isolation Solutions for Multi-Tenant Data Centers", Feb. 12, 2016, IEEE, IEEE Communications Surveys & Tutorials (vol. 18, Issue: 4, pp. 2787-2821) (Year: 2016).*

*Primary Examiner* — Davoud A Zand
(74) *Attorney, Agent, or Firm* — ADELI LLP

(57) ABSTRACT

Some embodiments provide a method for dynamically implementing quality of service (QoS) for machines of a network. The method identifies a QoS policy rule that defines a QoS policy to be implemented for machines that meet a set of criteria specified by the QoS policy rule. The method dynamically identifies a set of machines that meet the set of criteria. The method configures a set of managed forwarding elements of the network to implement the QoS policy rule for network traffic associated with the set of machines. In some embodiments, the method monitors network events (e.g., user logins, addition of new machines, etc.) and identifies a corresponding QoS policy rule to be enforced at corresponding locations in the network based on the detected event.

21 Claims, 10 Drawing Sheets

(56) References Cited

U.S. PATENT DOCUMENTS

| | | | |
|---|---|---|---|
| 8,737,416 B2* | 5/2014 | Kuo | H04L 47/10 |
| | | | 370/216 |
| 9,351,193 B2 | 5/2016 | Raleigh et al. | |
| 9,781,172 B2* | 10/2017 | Warrick | H04L 65/1073 |
| 10,015,102 B2 | 7/2018 | Giaretta et al. | |
| 10,447,541 B2 | 10/2019 | Gaikwad et al. | |
| 11,424,985 B2 | 8/2022 | Gaikwad et al. | |
| 2002/0112038 A1 | 8/2002 | Hessmer et al. | |
| 2004/0267897 A1* | 12/2004 | Hill | G06F 9/505 |
| | | | 709/217 |
| 2005/0108582 A1* | 5/2005 | Fung | G06F 1/3209 |
| | | | 713/300 |
| 2005/0177755 A1* | 8/2005 | Fung | G06F 1/3209 |
| | | | 713/300 |
| 2005/0195949 A1 | 9/2005 | Frattura | |
| 2009/0281996 A1 | 11/2009 | Liu et al. | |
| 2010/0091676 A1 | 4/2010 | Moran et al. | |
| 2012/0101952 A1* | 4/2012 | Raleigh | H04L 12/1417 |
| | | | 709/223 |
| 2013/0304616 A1 | 11/2013 | Raleigh et al. | |
| 2014/0098671 A1 | 4/2014 | Raleigh et al. | |
| 2014/0280846 A1 | 9/2014 | Gourlay et al. | |
| 2014/0310402 A1 | 10/2014 | Giaretta et al. | |
| 2016/0080221 A1 | 3/2016 | Ramachandran et al. | |
| 2017/0093637 A1 | 3/2017 | Baukes et al. | |
| 2017/0170990 A1 | 6/2017 | Gaddehosur et al. | |
| 2017/0250869 A1 | 8/2017 | Voellmy | |
| 2018/0048537 A1 | 2/2018 | Gaikwad et al. | |
| 2020/0007398 A1 | 1/2020 | Gaikwad et al. | |

* cited by examiner

400

Traffic Filter Table 410

| C_ID | Name | Traffic Type | CoS | DSCP |
|---|---|---|---|---|
| C1001 | VoIP | TCP:8008, 8009 UDP:8010 | 5 | 46 |
| C1002 | ERP | TCP:6069 | 4 | 44 |
| C1003 | NFS | TCP:2049 | 4 | 44 |

Dynamic Filter Table 420

| P_ID | Source | Destination | Time |
|---|---|---|---|
| P1001 | VoIP Server Group | Any | Any |
| P1002 | Finance Group | Any | Any |
| P1003 | Any | Backup Servers | backup_time |

QoS Policy Table 430

| P_ID | C_ID | Limit bandwidth | Reserve bandwidth | Shares |
|---|---|---|---|---|
| P1001 | C1001 | Unlimited | 2 Mbps | 50 |
| P1002 | C1002 | Unlimited | NA | 75 |
| P1003 | C1003 | Unlimited | NA | 100 |

*Fig. 4*

POLICY DRIVEN NETWORK QOS DEPLOYMENT

CLAIM OF BENEFIT TO PRIOR APPLICATIONS

This application is a continuation application of U.S. patent application Ser. No. 16/569,864, filed Sep. 13, 2019, now published as U.S. Patent Publication 2020/0007398. U.S. patent application Ser. No. 16/569,864 is a continuation application of U.S. patent application Ser. No. 15/490,805, filed Apr. 18, 2017, now issued as U.S. Pat. No. 10,447,541. U.S. patent application Ser. No. 15/490,805 claims priority to Indian Patent Application 201641027757, filed Aug. 13, 2016. U.S. patent application Ser. No. 16/569,864, now published as U.S. Patent Publication 2020/0007398 and U.S. patent application Ser. No. 15/490,805, now issued as U.S. Pat. No. 10,447,541 are incorporated herein by reference.

BACKGROUND

Quality of Service (QoS) is the ability to provide differentiated service (e.g., different priorities, service levels) to different types of traffic. In some cases, QoS is used to guarantee a certain level of performance to the data flows. For example, QoS can be used to prioritize network traffic for different applications or to guarantee a minimum available throughput for a certain type of network traffic (e.g., streaming video). With larger adoption of private or public cloud, it is highly desirable to serve traffic from multiple applications on a single network fabric for cost reduction and simplified management.

More and more business critical applications are deployed within datacenter or clouds. With today's wide range of applications that can be deployed, the network flows for applications such as voice over IP (VoIP) and streaming video content have converged. This calls for reliable QoS from the underlying network. Applications and machines can be rapidly spawned in virtualized environments, making it difficult to satisfy complex QoS requirements. Various elements of the network (e.g., application workloads, group membership, etc.) can change dynamically, altering the QoS requirements for various points in the network.

However, as the number of network elements (e.g., switches, routers, logical/physical ports) to be managed increases, it becomes increasingly difficult to scale deployment of QoS through the network. For example, datacenters can have thousands of VMs or virtual applications for various users and/or tenants that may be distributed over multiple machines in several different geographic regions. It is not trivial to provide consistent and accurate QoS in such environments for the various users and/or tenants.

Some market routers/switches attempt to provide dynamic QoS for networks, but often require manual configurations to implement a QoS policy in the network. Manually configuring resource pools, traffic filtering, and marking policies over such large number of VMs is a daunting task that requires significant resources and can lead to many difficulties in diagnosing issues throughout the network. Manual configurations can also result in unnecessary reservations of bandwidth, leading to an over-provisioned and inefficient network. In addition, such methods for deploying QoS is static and are unable to adjust to the frequent changes increasingly seen in today's networks. It is difficult to deploy and maintain dynamic, context-aware QoS in large, distributed environments.

BRIEF SUMMARY

Some embodiments provide a method for dynamically implementing quality of service (QoS) for machines of a network. In some embodiments, the method monitors the network events (e.g., user logins, addition of new machines, etc.) and identifies a corresponding QoS policy rule to be enforced based on the detected event. The method of some embodiments identifies a set of machines (and/or forwarding elements to which the machines couple) associated with the QoS policy rule and enforces the QoS policy rule by configuring the set of machines according to the QoS policy rule.

The QoS policy rules of some embodiments define a QoS policy to be implemented for the set of machines. In some embodiments, the QoS policy rules include one or more of a match portion, a time range value, and a QoS policy. The match portion of some embodiments includes a filter to identify a set of network traffic for which to apply the QoS policy rule. In some embodiments, the filter of the match portion identifies network traffic for the QoS policy based on values specified in headers of the network traffic (e.g., source/destination addresses, protocols, port values, etc.). The time range value identifies a range of time during which the QoS policy is effective. In such embodiments, the method only configures the set of machines according to the QoS policy rule during the time specified by the time range value.

In some embodiments, the method identifies the set of machines for a QoS policy rule by identifying a set of security groups associated with the QoS policy rule and identifying machines that are a part of the set of security groups as a part of the set of machines. Security groups of some embodiments identify different groups of machines or users (e.g., Windows machines, finance users, database servers, etc.) for which a QoS policy rule is to be applied. The identification of the machines, in some embodiments, is performed dynamically in response to detected events in the network. For example, in some embodiments the method configures the QoS policy rules for a machine when a user logs into the machine based on a security group associated with the user's account. In another example, the method configures the QoS policy rules for a machine based on properties of the machine (e.g., an operating system executing on the machine) when it is added to the network (e.g., when a VM is instantiated at a datacenter).

The method of some embodiments configures the QoS policy rules for a set of machines by identifying forwarding elements (e.g., software and/or hardware switches) associated with the set of machines and configuring the forwarding elements to manage the traffic for a set of ports associated with the set of machines. The method of some embodiments configures the forwarding elements for a particular QoS policy rule by reallocating the available bandwidth (e.g., setting a minimum throughput, a maximum throughput, assigning shares of the total available throughput, etc.) for the ports associated with the particular QoS policy rule. In some embodiments, the method assigns traffic from the set of ports to a particular network resource pool (e.g., a queue) that is assigned a portion of the bandwidth available for network traffic through the switch. The method creates a new network resource pool for the configured set of ports.

In some embodiments, the method is used to apply QoS policies for a logical network by configuring the physical forwarding elements (e.g., software/hardware forwarding elements) of a physical network. The QoS policy rules of some such embodiments are defined in terms of the logical network that is implemented by the forwarding elements of the physical network. For the logical ports specified in the QoS policy rules, the method identifies the corresponding ports for the machines in the physical network based on a topology that maps the logical network to the physical network.

The method of some embodiments enforces the QoS policy rules for traffic that exits a local network (e.g., to a machine on a different switch, in a different host machine, in a different datacenter, etc.). The method configures the set of machines to tag (e.g., with class of service (CoS) values or differentiated services code point (DSCP) values) packets that exit the local network to enforce QoS through an external network. The forwarding elements of the external network of some embodiments are configured to process the network traffic and enforce the QoS requirements based on the tags.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 4 illustrates an example of QoS policy rules for implementing QoS in a network.

DETAILED DESCRIPTION OF THE INVENTION

Figure 1:
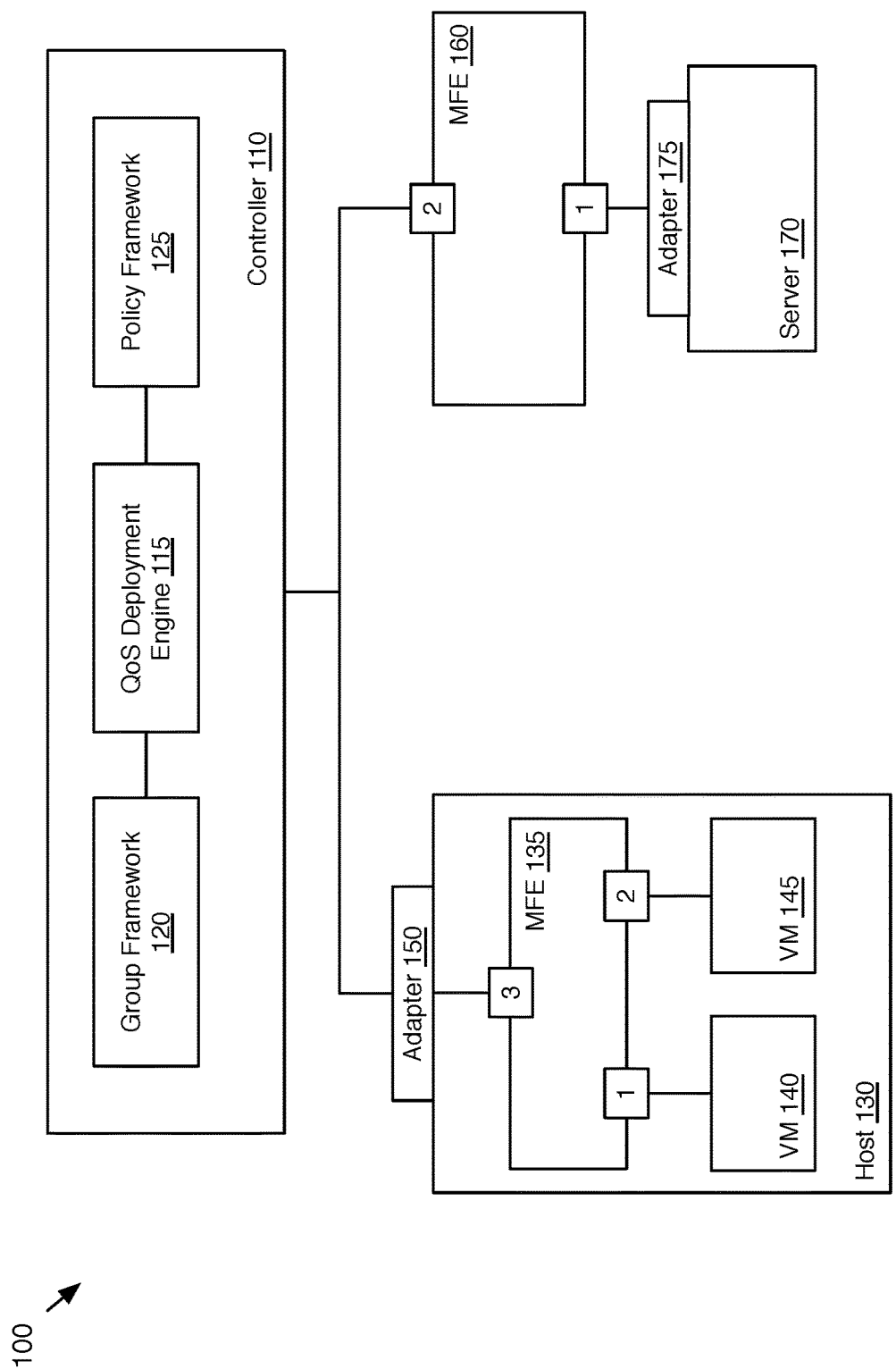
FIG. 1 illustrates an example of a system for deploying policy driven quality of service.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for dynamically implementing quality of service (QoS) for machines of a network. In some embodiments, the method monitors the network events (e.g., user logins, addition of new machines, etc.) and identifies a corresponding QoS policy rule to be enforced based on the detected event. The method of some embodiments identifies a set of machines (and/or forwarding elements to which the machines couple) associated with the QoS policy rule and enforces the QoS policy rule by configuring the set of machines according to the QoS policy rule.

The QoS policy rules of some embodiments define a QoS policy to be implemented for the set of machines. In some embodiments, the QoS policy rules include one or more of a match portion, a time range value, and a QoS policy. The match portion of some embodiments includes a filter to identify a set of network traffic for which to apply the QoS policy rule. In some embodiments, the filter of the match portion identifies network traffic for the QoS policy based on values specified in headers of the network traffic (e.g., source/destination addresses, protocols, port values, etc.). The time range value identifies a range of time during which the QoS policy is effective. In such embodiments, the method only configures the set of machines according to the QoS policy rule during the time specified by the time range value.

In some embodiments, the method identifies the set of machines for a QoS policy rule by identifying a set of security groups associated with the QoS policy rule and identifying machines that are a part of the set of security groups as a part of the set of machines. Security groups of some embodiments identify different groups of machines or users (e.g., Windows machines, finance users, database servers, etc.) for which a QoS policy rule is to be applied. The identification of the machines, in some embodiments, is performed dynamically in response to detected events in the network. For example, in some embodiments the method configures the QoS policy rules for a machine when a user logs into the machine based on a security group associated with the user's account. In another example, the method configures the QoS policy rules for a machine based on properties of the machine (e.g., an operating system executing on the machine) when it is added to the network (e.g., when a VM is instantiated at a datacenter).

The method of some embodiments configures the QoS policy rules for a set of machines by identifying forwarding elements (e.g., software and/or hardware switches) associated with the set of machines and configuring the forwarding elements to manage the traffic for a set of ports associated with the set of machines. The method of some embodiments configures the forwarding elements for a particular QoS policy rule by reallocating the available bandwidth (e.g., setting a minimum throughput, a maximum throughput, assigning shares of the total available throughput, etc.) for the ports associated with the particular QoS policy rule. In some embodiments, the method assigns traffic from the set of ports to a particular network resource pool (e.g., a queue) that is assigned a portion of the bandwidth available for network traffic through the switch. The method creates a new network resource pool for the configured set of ports.

In some embodiments, the method is used to apply QoS policies for a logical network by configuring the physical forwarding elements (e.g., software/hardware forwarding elements) of a physical network. The QoS policy rules of some such embodiments are defined in terms of the logical network that is implemented by the forwarding elements of the physical network. For the logical ports specified in the QoS policy rules, the method identifies the corresponding ports for the machines in the physical network based on a topology that maps the logical network to the physical network.

The method of some embodiments enforces the QoS policy rules for traffic that exits a local network (e.g., to a machine on a different switch, in a different host machine, in a different datacenter, etc.). The method configures the set of machines to tag (e.g., with class of service (CoS) values or differentiated services code point (DSCP) values) packets that exit the local network to enforce QoS through an external network. The forwarding elements of the external network of some embodiments are configured to process the network traffic and enforce the QoS requirements based on the tags.

An overview of the process for deploying policy driven QoS has been described above. Further details and examples of the deployment and implementation of policy driven QoS are described below. Specifically, Section I describes a distributed network environment for deployment of policy driven QoS. Section II describes examples deploying and implementing policy driven QoS in the network. Finally, section III describes an electronic system with which some embodiments of the invention are implemented.

I. Distributed Network System

Some embodiments of the invention are performed for a distributed network system. The distributed network system of some embodiments includes controllers that manage forwarding elements of a network to modify forwarding behaviors, enforce security policies, etc. The managed forwarding elements (MFEs) of some embodiments are software and hardware forwarding elements (e.g., routers, switches, etc.) that transmit network communications (e.g., packets, datagrams, etc.) for end machines (e.g., virtual machines (VMs), servers, etc.). In some embodiments, the controllers, forwarding elements, and end machines are distributed over several datacenters in various geographic regions. In some embodiments, the MFEs are distributed virtual switches (DVSs), which logically implement a switch across multiple switches at multiple hosts in the network.

Some embodiments of the invention provide a QoS system for administrators to define dynamic QoS policies that can be applied throughout the distributed network system. In some embodiments, dynamic QoS policies are used to define QoS policies for network traffic based on various characteristics of the network traffic or a machine (e.g., a source/destination machine) associated with the network traffic. For example, in some embodiments, the dynamic QoS policies are based on one or more of an identity of a user logged into a machine, a source application for network traffic from the machine, the current time of day, or the source and destination machines for the network traffic.

FIG. 1 illustrates an example of a QoS system 100 for deploying policy driven QoS in a distributed network system. This example shows a controller 110 that manages managed forwarding elements (MFEs) 135 and 160. The MFEs of different embodiments include various numbers of software and/or hardware forwarding elements.

In this example, MFE 135 is a software forwarding element that operates within a hypervisor (not shown) at host machine 130. Host machine 130 also shows two VMs that operate on the hypervisor. VMs 150 and 152 are coupled to ports 1 and 2 of MFE 140. Host machine 130 also includes a physical adapter 150. Physical adapter 150 of some embodiments is a physical network interface controller (PNIC) for exchanging data with the network for all of the VMs operating on host machine 130. The bandwidth (or throughput capacity) of the physical adapter is shared between all of the VMs (and other services) operating on host machine 130.

MFE 160 is a hardware forwarding element (e.g., top of rack switch, a standalone hardware appliance, etc.) that is coupled to server 170. Server 170 can be any type of hardware machine (e.g., a rack server, standalone computer, laptop computer, etc.) that couples to a MFE to connect to the network. Server 170 connects through physical adapter 175 to port 1 of MFE 160. MFEs 135 and 160 are also coupled to each other. In this example, each MFE is coupled directly to every other MFE, but in some embodiments, some MFEs may have one more other forwarding elements (e.g., MFEs, external networks, etc.) between them.

End machines 150-158 (i.e., virtual machines (VMs) 150-156 and server 158) communicate with each other and with other machines in the network through MFEs 135 and 160. In some embodiments the end machines 150-158 are machines in a datacenter that are associated with different tenants of the datacenter. Even machines that are directly connected to a single hardware switch (e.g., VMs 150 and 152) may be associated with different tenants or logical networks. The implementation of logical networks on physical networks is described in further detail below with reference to FIG. 2.

Controller 110 is for managing the MFEs 135 and 160. Controller 110 of some embodiments manages the MFEs to modify forwarding behaviors, enforce security policies, instantiate new machines, etc. In this example, controller 110 includes quality of service (QoS) deployment engine 115, group framework 120, and policy framework 125.

Group framework 120 of some embodiments identify groups of machines associated with a particular QoS policy rule. Group framework 120 provides a way to create dynamic containers (or groups) for machines in a network and provides corresponding locators (e.g., Internet protocol (IP) addresses, virtual network interface controller (VNIC) IDs, associated forwarding elements, etc.) for the machines within each container. The locators can be used to identify where QoS policy changes are to be applied, filters for the QoS policy rules, etc.

In some embodiments, the groups are based on a security group (SG) construct which allows for the creation of dynamic containers (or groups) of machines. The security groups of some embodiments are based on groups of users or machines that are identified for other applications (e.g., security policies, active directory (AD) groups/users, etc.). In some embodiments, a machine is a part of multiple security groups. For example, if a Finance user logs in on a Windows machine, the machine may be a part of a Finance security group for all finance users and a Windows security group for all Windows machines.

In some embodiments, group framework 120 identifies membership for the security groups based on tags assigned to the machines or based on dynamic expressions (e.g., VMs with names beginning with "windows", VMs with logged in finance users, VMs with a security tag of "virus-found", etc.). Group framework 120 of some embodiments handles various group change notifications (e.g., when a user logs in/out of a machine, a machine is removed from the network, etc.), and provides effective VM membership for each group at any point. For example, when a machine is added to the network or when a user logs in or out of a machine, the security group for the associated machine may change. In some embodiments, security services operate on the various VMs to identify potential security problems and to tag the problem VMs. Group framework 120 of some embodiments identifies groups of VMs based on the assigned security tags. The security groups of some embodiments are used to define the QoS policies to be deployed in the network.

Policy framework 125 acts as a powerful yet flexible tool to define QoS requirements. In some embodiments, policy framework 125 is an existing policy framework that allows an administrator to configure policies for other services as well (e.g., firewall, endpoint security and service insertion). Policy framework 125 of some embodiments store QoS policy configurations that specify when, where, and how the QoS policies are to be applied throughout the network system. For example, the QoS policy configurations of some embodiments specify various filters (e.g., groups, times when a QoS policy rule should be active, packet filters, etc.) at which to apply a QoS policy rule (e.g., marking policies for class of service (CoS) and differentiated services code point (DSCP) tagging, modifying physical shares information for a port, etc.). The definition of QoS policy rules for policy framework 125 is defined in further detail below with reference to FIG. 4.

Policy framework 120 and group framework 125 describe how the QoS policy rules are defined (e.g., where within the network, which traffic, what QoS actions are to be taken, etc.) for the network. QoS deployment engine (QDE) 115 communicates with policy framework 120 and group framework 125 to enforce the QoS policy rules on the switches and ports for certain virtual machines. In some embodiments, QDE 115 applies machine qualifiers (e.g., Internet Protocol (IP) addresses) on the ports to enforce QoS policy rules for inter-machine traffic.

QDE 115 of some embodiments is a centralized module for automating the application of dynamic QoS policy rules in the network. In some embodiments, QDE 115 of some embodiments identifies QoS policy rules (e.g., received from an administrator of the network) from the policy framework 120, identifies the effective machines for the groups in the QoS policy rules from the group framework 125, and configures MFEs 135 and 160 to enforce the QoS policy rules for the identified effective machines (e.g., for the ports at a forwarding element identified for the effective machines). In some embodiments, the QoS policy attributes (e.g., dynamic filters, traffic filtering, etc.) are configurable on individual ports of the MFEs.

QDE 115 of some embodiments enforces the QoS policy rules by tagging, assigning bandwidth reservations, and throttling specific types of traffic in order to distribute available bandwidth (e.g., at a shared pNIC of a host computer) for the different ports of the MFEs. In some embodiments, the QoS policy rules modify network resource pools that control the throughput for machines (or port groups) assigned to the network resource pools. In some embodiments, the QoS policy rules change the assignment of machines (or their ports) to different port groups (e.g., based on a logged in user, at different times of day, etc.) to apply different QoS policies.

QDE 115 of some embodiments monitors group framework 120 and policy framework 125 for changes in the QoS policies, as well as the MFEs to detect changes at the MFEs (e.g., user logins, machine instantiations, etc.) that may affect the QoS policies. QDE 115 is described in further detail below with reference to FIG. 3.

Figure 2:
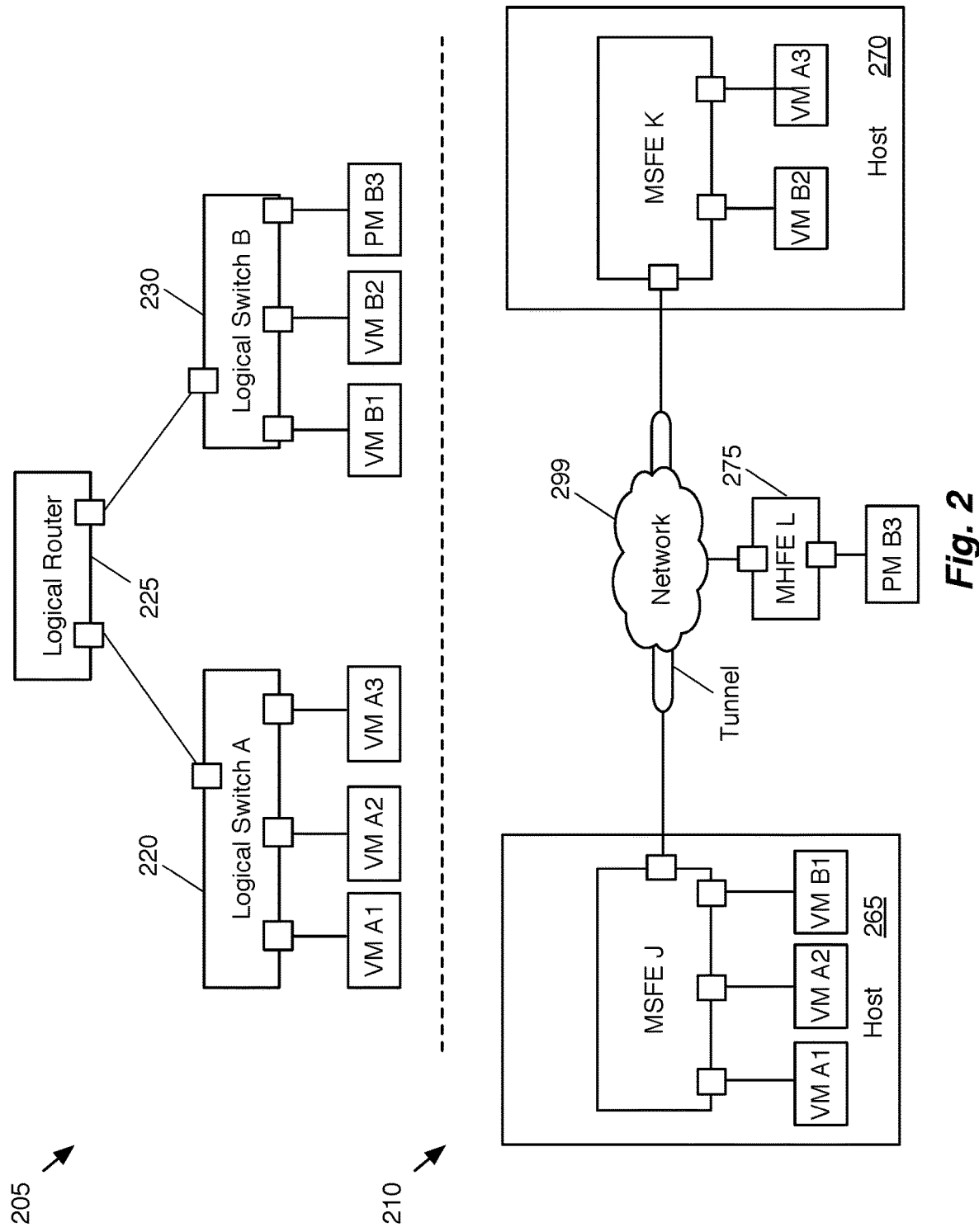
FIG. 2 illustrates an example of a logical forwarding element of a logical network that is implemented on physical elements of a physical network.

FIG. 2 illustrates an example of a logical network that is implemented on a physical network. This figure shows end machines (VMs A1-A3 and B1-B2 and physical machine PM B3) that are logically connected according to a logical forwarding elements of a logical network 205, while being physically connected to physical forwarding elements of a physical network 210. In some embodiments, the physical forwarding elements are distributed virtual switches, which logically implement a switch across multiple switches at multiple hosts in the network.

The logical network 205 includes three logical forwarding elements (a logical router 225 and two logical switches 220 and 230) that describe the desired forwarding behaviors for the end machines VMs A1-A3, VMs B1-B2, and PM B3 in the logical network. In some embodiments, the virtual machines VMs A1-A3 and B1-B2 operate on virtualization software that executes on the host machines 265 and 270. Specifically, VMs A1-A3 are connected through logical ports to a first logical switch 220. VMs B1-B2 and physical machine PM B3 are connected through logical ports of a second logical switch 230. The two logical switches 220 and 230 are connected to ports of a logical router 225.

The physical network 210 shows the actual physical connections between the end machines VMs A1-A3, B1-B2, and PM B3. Physical network 210 shows two hosts 265 and 270. The hosts 265 and 270 have managed forwarding elements (MSFEs) J and K, which connect to VMs A1, A2, and B1, and VMs B2 and A3, respectively. Physical network 210 also shows a MHFE L (a hardware forwarding element) and a physical machine PM B3 (e.g., server, bare-metal machine, etc.) that is attached to a physical port of the MHFE 275. The MSFEs J and K and the MHFE L are connected to each other by tunnels through a network 299. The connections of the end machines to the logical switches as well as the connections of the logical switches to the logical router are defined using logical ports, which are mapped to the physical ports of the MSFEs J and K and of the MHFE L.

The connections in the logical network differ from the connections of the physical network. For example, although end machines VMs B1-B2 and PM B3 are connected to a single logical switch 230 in the logical network 205, they are all physically connected to different managed forwarding elements in the physical network 210. The MFEs (i.e., MSFEs and MHFEs) could reside in different machines, different subnets, or even different datacenters in different parts of the world. The MFEs of some embodiments implement the logical network by creating tunnels for communicating logical network data to other forwarding elements.

The network control system of some embodiments configures the forwarding elements of the physical network to implement the logical forwarding elements of the logical network by creating tunnels and modifying forwarding behaviors of the managed forwarding elements. In some embodiments, the MSFEs J and K and the MHFE L of the physical network implement the logical forwarding elements (LFEs) 220-230 through a set of flow entries for routing the packets of the logical network. Alternatively, or conjunctively, some or all of the managed forwarding elements are not flow-based software forwarding elements, but instead process packets based on configuration data that is generated by their respective local controllers.

Although, in the illustrated example, each managed forwarding element implements logical forwarding elements for a single logical network, in some embodiments, a managed forwarding element may be attached to machines for logical forwarding elements of different logical network. A single managed forwarding element can be configured to implement different logical networks for different tenants.

In some embodiments, the QoS policies are defined for logical networks. The QoS deployment engine of some embodiments translates the logical QoS policies to implement the logical policies in the physical network. Examples of deploying and implementing policy driven QoS are described below.

II. Deploying and Implementing Policy Driven QoS

Some embodiments provide a method for programmatically managing QoS deployments in such dynamic environments. Some embodiments provide a QoS Deployment Engine that applies QoS policies that are application centric, user identity aware, time bound and application workload aware. The method of some embodiments uses a policy framework and a group framework (e.g., dynamic virtual machine containers, security groups, etc.) to accommodate the QoS policies. In some embodiments, the QoS deployment engine is a module operating within a controller (or a cluster of controllers) that manage forwarding elements of a network system.

Figure 3:
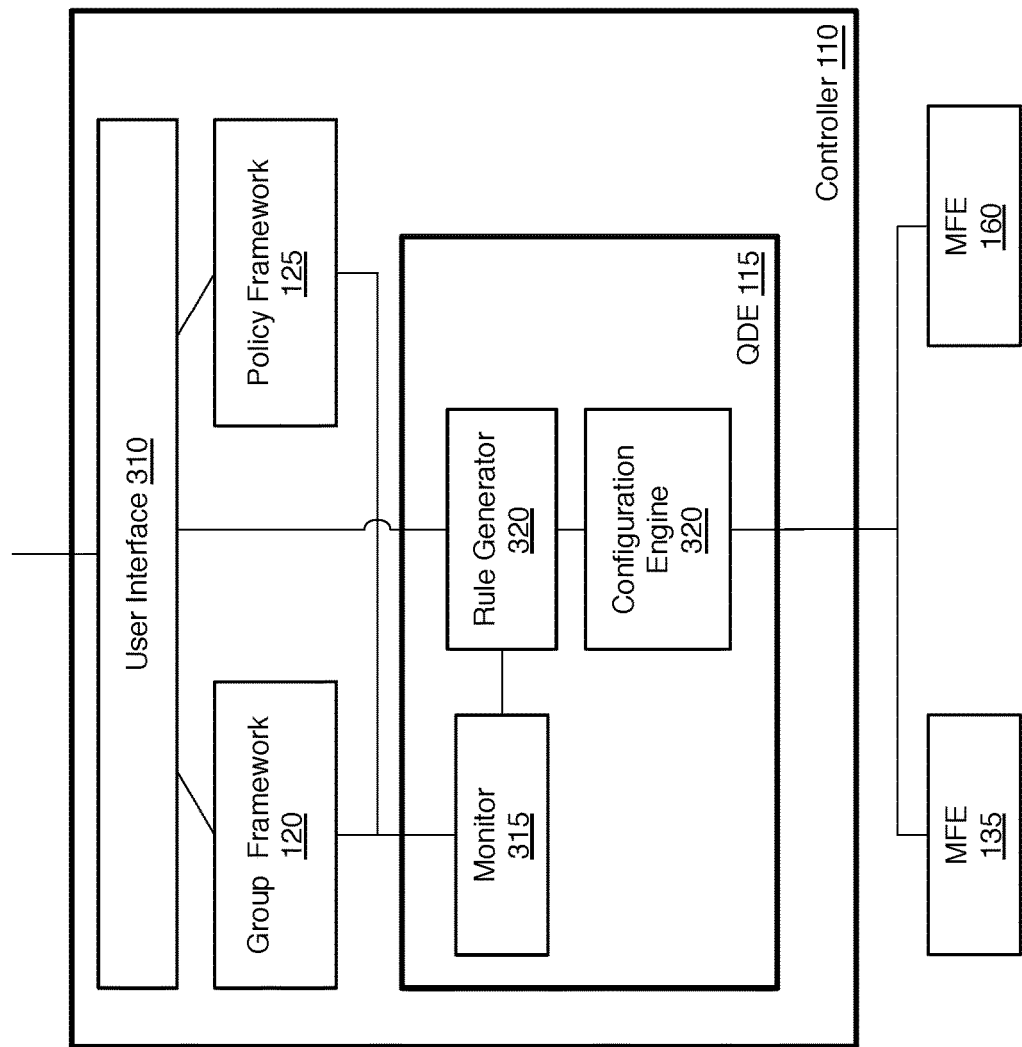
FIG. 3 illustrates an example of a QoS deployment engine of some embodiments.

FIG. 3 illustrates an example of a QoS deployment engine (QDE) of some embodiments. As described in the example of FIG. 1, QDE 115 operates on a controller 110 and communicates with policy framework 120 and grouping object framework 125 to configure MFEs 135 and 160. In this example, QoS deployment engine 115 includes an interface 310, a monitoring engine 315, a rule generator 320, and a configuration engine 325.

Interface 310 of some embodiments allows a user (e.g., an administrator) to interact with the controller, configuring logical networks, updating security policies, setting up security groups, etc. In some embodiments, interface 310 receives QoS policy rules from the user in order to update the QoS policies in the policy framework 125 and define rules based on groups in the group framework 120. In some embodiments, interface 310 allows a user to initiate a QoS deployment and to view the status of the QoS deployment in the network. Interface 310 of some embodiments, provides the user with an interface to set the QoS policy for a logical network, which is then translated to elements in the physical network based on a network topology. In some embodiments, interface 310 provides a user interface to allow the user to set dynamic QoS policies based on groups, time, application workloads, etc.

In some embodiments, the QoS policies are set by an administrator of a multi-tenant network in order to provide bandwidth guarantees to different tenants. For example, in a multitenant network with multiple types of applications (e.g., voice, data, video, etc.) converging on a single physical link, it becomes important to segregate packets on the basis of the associated tenant, the nature of the application, and the time of day. For example, Tenant A may have an "Enterprise" account with bandwidth priorities and high levels of guaranteed throughput, while Tenant B may a "Standard" account. In this case, the service provider must ensure that packets of Tenant A are treated with priority and are guaranteed certain throughput, while allowing Tenant B to efficiently use any remaining available throughput.

Monitoring engine 315 of some embodiments listens for events that affect the QoS policies in the network. The events of some embodiments are triggered by an administrator of the network (e.g., when the bandwidth allocation for a particular user group is changed, tagging policies for traffic from a particular application are updated, a new VM is instantiated for a security group, etc.). In some embodiments, the events are triggered based on detected events in the network (e.g., when a particular VM is moved to a new location in the network, a new user logs into a particular machine, etc.).

Monitoring engine 315 of some embodiments listens for timer events. Timer events allow the monitoring engine 315 to deploy policies based on the time of day configured in a rule table. For example, when a QoS policy rule applies a QoS policy from 10 PM to 4 AM, two tasks are created. One task will generate an event at 10 PM and the other task will generate an event at 4 AM. Both of these events will be detected by monitoring engine 315 and handled by QDE 115 to apply and retract the QoS policy respectively.

For each of these detected events, QDE 115 goes through the groups of the group framework 120 and the policies of the policy framework 125 to determine if any QoS configurations have changed. In some embodiments, QDE 115 then generates any changed QoS policy rules and configures the changes for individual vNIC ports or for distributed port groups at the MFEs in the network. This proactive listening of events and tweaking the QoS policies on ports and switches accordingly is what makes this QoS policy driven and dynamic. For example, when a user from the finance group logs into a machine, the machine is automatically registered as a member of the finance security group, and the machine is automatically configured with all of the QoS policies designated for the finance users.

Rule generator 320 generates QoS policy rules based on the policies of policy framework 125, groups from the group framework 120, and events detected at monitor 315. In some embodiments, the QoS policy rules are made up of a match portion with a traffic filter and/or a dynamic filter, and an action portion that defines the QoS policy (e.g., packet marking, assigning to a network resource pool, traffic shaping, etc.) to be performed for network traffic matching the match portion. QoS policy rules are described in further detail below with reference to FIG. 4.

Rule generator 320 of some embodiments then translates the QoS policy rules to real (physical) instantiations of the QoS policy for the network. Rule generator 320 of some embodiments uses the group framework 120 to identify machines (e.g., based on IP addresses, ports, etc.) to be used to define filters for applying the QoS and to identify ports at MFEs where the QoS policy rules are to be applied. In some embodiments, configuration engine 325 configures the MFEs to specify traffic filters based on the source and destination of the network traffic. For example, in some cases, QoS policies are defined specifically for traffic between a particular source and destination (e.g., traffic between web and database servers).

In some embodiments, when multiple QoS policy rules can be applied for a particular machine (e.g., when the particular machine is a part of multiple security groups), the QoS policy rules to be applied will be determined based on a precedence order for the rules. For example, in the case of a finance user logged into a Windows machine, user-based QoS policy rules may take precedence over QoS policy rules based on the operating system.

In some embodiments, rule generator 320 translates the QoS policy rules based on a logical network topology defined for the network. In some embodiments, the logical topology for a logical network is overlaid on the physical network as described above with reference to FIG. 2. In some such embodiments, rule generator 320 identifies the logical locations (e.g., logical ports, etc.) to be affected by a QoS policy and identifies corresponding physical locations (e.g., physical ports, etc.) in the physical network. The rule generator 320 of some embodiments identifies the corresponding physical locations from a mapping (not shown) of the logical elements of the logical network to the physical elements of the physical network.

Configuration engine 325 of some embodiments implements the QoS policy rules generated by the rule generator 320. In some embodiments, configuration engine 325 configures traffic shaping at ports of the MFEs 135 and 160 based on filters and actions defined in the QoS policy rules. In some embodiments, configuration engine 325 uses application programming interfaces (APIs) provided by the MFEs to configure the MFEs. The APIs of some embodiments allow configuration engine 325 to implement the QoS policy rules by configuring port level settings such as traffic shaping, user-defined network resource pool allocation and/or creation, tagging and marking of packets, etc. at the MFEs.

In some embodiments, configuration engine 325 configures network resource pools to distribute the available bandwidth at the switches to enforce and implement QoS policies. Network resource pools determine the bandwidth that different network traffic types are given on a MFE (e.g., a vSphere distributed switch). The MFEs of some embodiments have various default network resource pools for host traffic and for VM data traffic. In some embodiments, configuration engine 325 can create custom network resource pools or reallocate bandwidth for existing network resource pools to distribute the available bandwidth between the various ports of the MFE.

Configuration engine 325 of some embodiments identifies groups of ports (and associated machines) from the QoS policy rules and assigns the port groups to different network resource pools. An end machine (e.g., a VM, server, etc.) set to be part of a distributed virtual port group (i.e., connected to a port in the port group) which belongs to a particular network resource pool will follow the bandwidth reservations and limits set for that particular pool. Configuration engine 325 of some embodiments controls the bandwidth available to each network resource pool by setting the physical adapter shares and host limit for each network resource pool.

The physical adapter shares assigned to a network resource pool determine the share of the total available bandwidth guaranteed to the traffic associated with that network resource pool. The share of transmit bandwidth available to a network resource pool is determined by the network resource pool's shares and what other network resource pools are actively transmitting. For example, ports for four network resource pools A-D are actively transmitting. Pool A is set to 100 shares, while pools B and C are set to 50 shares each. When the physical adapter is saturated (e.g. network traffic exceeds the available bandwidth), pool A receives 50% (100/(100+50+50)) of the available bandwidth, while pools B and C each receive 25% (50/(100+50+50)) of the available bandwidth. If the ports from pool B are no longer sending network traffic, but the physical adapter is still saturated, the available bandwidth is distributed among the active pools based on the assigned shares. In this example, pool A is allowed up to 67% (100/(100+50)) of the available bandwidth and pool B is allowed up to 33% (50/(100+50)).

In addition to, or in place of, configuring network resource pools, the configuration engine 325 of some embodiments marks traffic with QoS tag values to allow the QoS policies to be upheld as the network traffic traverses the network. For virtualized environments, the hypervisor presents a trusted boundary that sets the respective QoS values for the different traffic types. The marking (or tagging) of the network traffic with the QoS tag values allows the external physical switching infrastructure to continue to uphold appropriate QoS policies. No reclassification is necessary at the server-facing port of a leaf switch. For the QoS policies to be upheld from end-to-end, some embodiments require that physical switches in the network are configured with a common understanding of the QoS tag values (e.g., class of service (CoS) and differentiated services code point (DSCP) tag values). For example, a DSCP tag value of 44 should indicate the same queue priority, acceptable drop rate and acceptable latency on all physical (and virtual) switches in the network.

When a congestion point is reached in the physical switching infrastructure, the QoS tag values would be examined to determine how the network traffic should be sequenced—and potentially dropped—or prioritized. When the end machines are connected to tunnel-based logical switches (e.g., VXLAN) or networks, the QoS values from the internal packet headers are copied to the encapsulated headers. This enables the external physical network to prioritize the traffic based on the tags in the external header.

In some embodiments, the QDE allows controllers to program QoS parameters across a virtualized network (e.g., vSphere). The policy driven QDE allows administrators to define QoS policy rules that define QoS policies (e.g., traffic shaping, network resource pool allocation, packet tagging, etc.) based on multiple parameters (or match conditions) including the nature of the traffic, identity of a logged in user, time of day, etc.

For example, QoS policy rules may specify match conditions based on the type of the network traffic (e.g., file transfer protocol (FTP) traffic, streaming video traffic, voice over IP (VoIP) traffic, etc.). The nature of the applications and their associated traffic plays a role in the type of QoS policies to be applied to the network traffic. Some applications are latency sensitive while others are throughput sensitive, placing different requirements on how QoS is performed for the different types of traffic. For example, VoIP and streaming applications need to be ensured limited jitter or variance in packet latency.

QoS policy rules of some embodiments are based on dynamic properties (e.g., a currently logged-in user, operating system, designated security group, etc.) of the machines associated with the network traffic. In some embodiments, the QoS policy rules are used to perform QoS for specific inter-machine traffic (e.g., traffic between particular groups of machines). For example, some embodiments of the QoS policy rules apply QoS policies (e.g., providing for low latency and guaranteed bandwidth) for traffic between Web Tier machines and DB Tier machines to ensure a basic level of service.

The QoS policy rules of some embodiments specify time ranges during which the policy rules are to be applied. For example, in some cases it is desirable to have a low priority for network traffic for backup applications during peak hours of the day to ensure a high level of performance for standard network traffic while prioritizing the backup traffic during off-peak hours (e.g., 2 am to 6 am), ensuring that the backups are able to be performed successfully.

FIG. 4 illustrates an example of QoS policy rules for implementing QoS in a network. Specifically, this example shows traffic filter table 410, dynamic filter table 420, and a QoS policy table 430.

In order to implement such QoS policy rules, some embodiments store the policies in a policy framework. In this example, the traffic filters, dynamic filters, and QoS policies (e.g., QoS actions or rules) are stored in three corresponding tables, traffic filter table 410, dynamic filter table 420, and QoS policy table 430. Different embodiments can store the QoS policy rules in different ways.

Traffic filter table 410 of some embodiments provides a traffic class construct to group virtual applications in a group with similar QoS requirements. Traffic filter table 410 shows a C_ID column that identifies the stored traffic classes and a Name column that provides a meaningful name to each class. Traffic classes allow administrator to classify ingress/egress traffic by port numbers of various protocols (e.g., TCP, UDP, etc.). Traffic for different ports can be grouped in one class. By allowing separate traffic class constructs, different policies can use the same traffic classes. In order to classify the ingress/egress traffic, traffic filter table 410 includes a traffic type column that identifies a filter for the traffic that is a part of the traffic class.

Traffic filter table 410 also shows columns for QoS tags (CoS and DSCP). Using a traffic filtering and marking policy, one can apply a QoS tag to a certain type of traffic. The traffic filtering and marking policy represents an ordered set of network traffic rules for security and for QoS tagging of the data flow through the ports of a distributed switch. In general, a rule (or filter) consists of a qualifier for traffic, and of an action for restricting or prioritizing the matching traffic. The QoS tags are applied to the network traffic to identify the QoS policies for the network traffic at other forwarding elements that may not be managed by controllers. Each of the forwarding elements in the network can apply the QoS policies based on the QoS tag values. The QoS tags used to mark the network traffic are commonly understood by switches from most vendors.

The QoS tags of some embodiments include CoS and DSCP tags, which identify tag values that can be applied to network traffic of the traffic class. The two types of QoS tags are supported at different layers (e.g., L2 and L3 layers) of a network stack in the physical switching infrastructure. The L2 QoS is sometimes referred to as "class of service (CoS)" and the L3 QoS as "differentiated services code point (DSCP) marking." When virtual machines are connected to the VXLAN-based logical switches or networks, the QoS values from the internal packet headers are copied to the VXLAN-encapsulated header. This enables the external physical network to prioritize the traffic based on the tags on the external header.

Dynamic filter table 420 identifies network traffic based on more dynamic elements that are subject to more frequent changes. In this example, dynamic filter table 420 includes columns for a policy id (P_ID) that identifies the dynamic filter. Dynamic filter table 420 also includes columns to filter for traffic based on a source and/or destination of the traffic. The source indicates the originator or sender of the traffic. Similarly, the destination indicates the receiver of the traffic. In some embodiments, the source and destination for the dynamic filters are based on security groups that are defined for other network applications (e.g., security policies, active directory (AD) groups/users, etc.). The groups allow QoS policies to be applied to network traffic originating from (or destined for) a particular set of machines (e.g., machines used by Finance users, machines running a particular operating system, etc.).

In some embodiments, dynamic filter table 420 identifies network traffic based on a time of day. In this example, the time is described with a variable "backup_time." The QoS policy rules of some embodiments allow an administrator to create a time object that specifies day(s) of the week, hours of the day, and/or frequencies for a QoS policy rule. For each of these columns (source, destination, and time), "Any" specifies that no additional filter is specified for that property of the network traffic.

QoS policy table 430 provides a QoS policy construct to define the QoS action to be performed for each QoS policy rule. QoS policy table 430 combines the traffic filters of traffic filter table 410 (based on the traffic filter ID C_ID) and the dynamic filters of dynamic filter table 420 (based on the policy ID P_ID) with QoS actions to be performed for network traffic matching the filters. The QoS policy construct binds a traffic class with a bandwidth restriction by means of specifying the limit bandwidth and/or reserve bandwidth or shares for the bandwidth. The limit bandwidth describes a maximum throughput for network traffic that matches the filters for the QoS policy rule, the reserve describes a minimum guaranteed throughput, and the shares allow the bandwidth to be distributed (when the physical adapter is saturated) based on the shares allocated to network resource pools to which the active machines are assigned.

In this figure, tables 410-430 show records for implementing three examples of QoS policy rules. In the first example, an administrator wants to assign a higher priority to the VoIP traffic over other types of traffic and to reserve 2 Mbps for VoIP traffic originating from a set of VoIP servers. The first record in the traffic filter table 410 identifies the VoIP traffic based on protocol ports (i.e., TCP: 8008, 8009; or UDP: 8010). Traffic filter table 410 also identifies QoS tags (CoS 5 and DSCP: 46) to assign a higher priority to the traffic as it passes through other forwarding elements of the network. The first record of the dynamic filter table 420 specifies that the rule should be applied to all traffic that originates from a server in the VoIP server group. The first record of the QoS policy rules table 430 shows that, for the traffic identified by the filters (i.e., VoIP traffic originating from VoIP servers), no limit is specified, but at least 2 Mbps of throughput are guaranteed for the network traffic.

In the second example, the administrator wants to provide differentiated performance to enterprise resource planning (ERP) traffic for the finance group because the finance group depends on this application when dealing with customers. The second record in the traffic filter table 410 identifies the ERP traffic based on protocol ports (i.e., TCP: 6009). The second record of the dynamic filter table 420 specifies that the rule should be applied to all traffic that originates from a machine at which a user from the Finance group is logged in. The QoS rule should be applied automatically to any new member of the finance group. In a virtual desktop infrastructure (VDI) environment, in which a desktop operating system is hosted within a VM running on a host machine, the QoS rules should be maintained for different users of the finance group.

The second record of the QoS policy rules table 430 shows that 75 physical adapter shares (instead of the default 50) are allocated for the traffic identified by the filters (i.e., ERP traffic originating from Finance group users) to try to provide a greater share of the available bandwidth to the filtered traffic. In some embodiments, the physical adapter shares are assigned to a network resource pool of a host machine. The network resource pool then shares the allocated bandwidth between all of the traffic for all of the machines assigned to the particular network resource pool at the host machine. In other embodiments, the bandwidth is allocated to account for the number of machines assigned to each network resource pool. For example, in some such embodiments a network resource pool with 5 machines will have a proportionally greater number of adapter shares than a network resource pool with 4 machines, even when the policy rules are assigned the same number of shares.

In the third example, the administrator wants to provide additional bandwidth for backup applications to access backup storages during the night, while throttling the bandwidth for the backup applications during the day. Specifically, the administrator wants to increase the physical adapter shares for the network resource pool assigned to the backup applications to 100, but only between the hours of 10 pm to 4 am.

The third record in the traffic filter table 410 identifies the backup traffic based on protocol ports (TCP: 2049). The third record of the dynamic filter table 420 specifies that the rule should be applied to all traffic that is destined for a server in the Backup servers group. In this example, the third record of the dynamic filter table 420 also specifies a time attribute that specifies a variable ("backup_time") that represents a time range (e.g., 10 pm to 4 am). The third record of the QoS policy rules table 430 shows that 100 physical adapter shares (instead of the default 50) are allocated for the traffic identified by the filters (i.e., backup traffic destined for the backup servers) to try to provide a greater share of the available bandwidth to the filtered traffic during the designated time period. For times outside of the designated time period, the QoS policy rule is not applied. In some embodiments, a secondary QoS policy rule is identified. The secondary QoS policy rule of some embodiments is an explicit counterpart (e.g., a QoS policy rule for a time range between 4 am and 10 pm) or a default QoS policy rule (e.g., a rule to restore the adapter shares for the identified group of machines to a default value).

The records in the tables of the policy framework define the policies that should be implemented in the network. The QoS policies of some embodiments are based on input received from an administrator of the network. However, in order to implement the QoS policies, they must be deployed to the various points (e.g., ports at the MFEs) of the network.

Figure 5A:
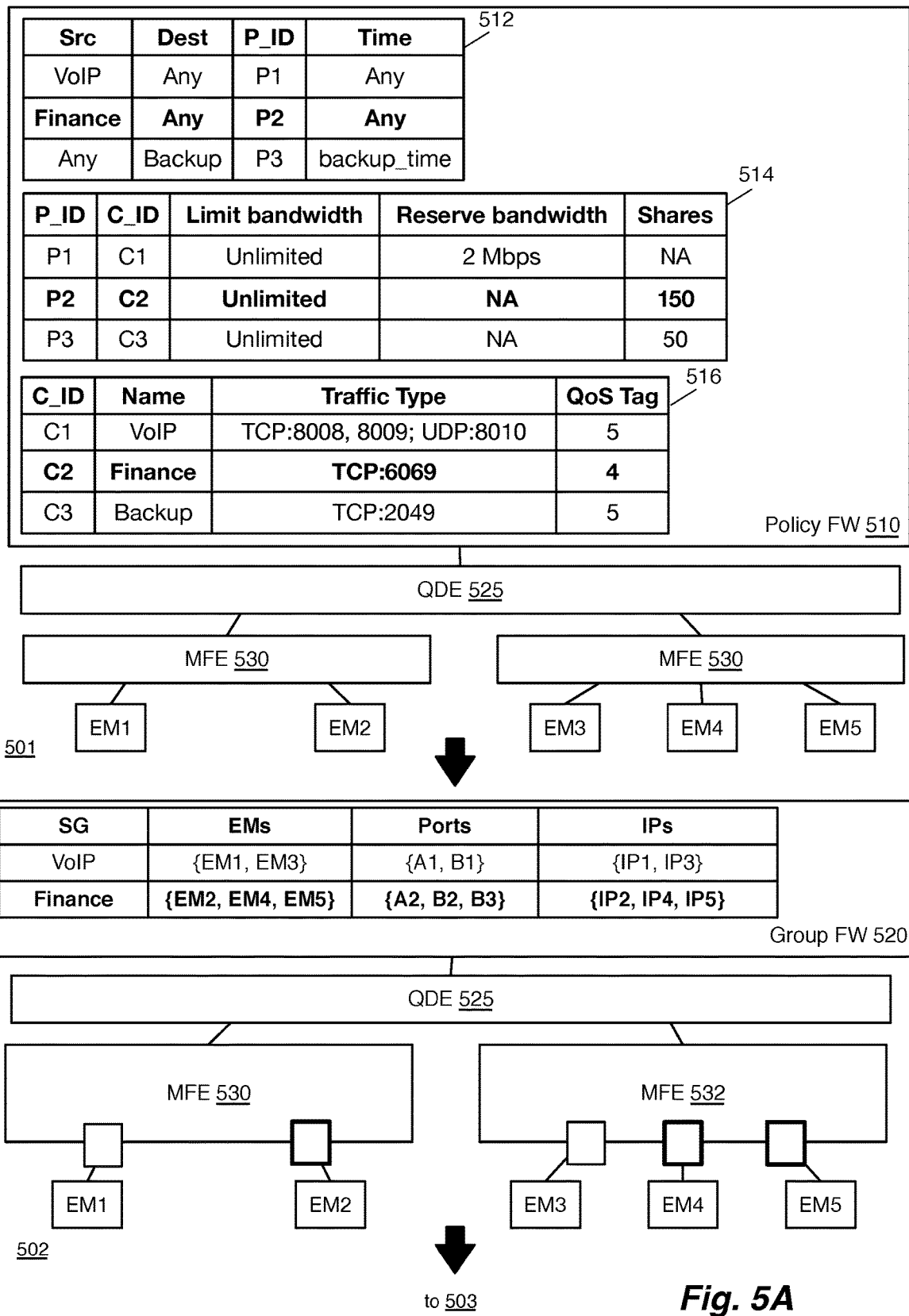
FIGS. 5A-B illustrate an example of deploying policy driven quality of service in a network.
Figure 5B:
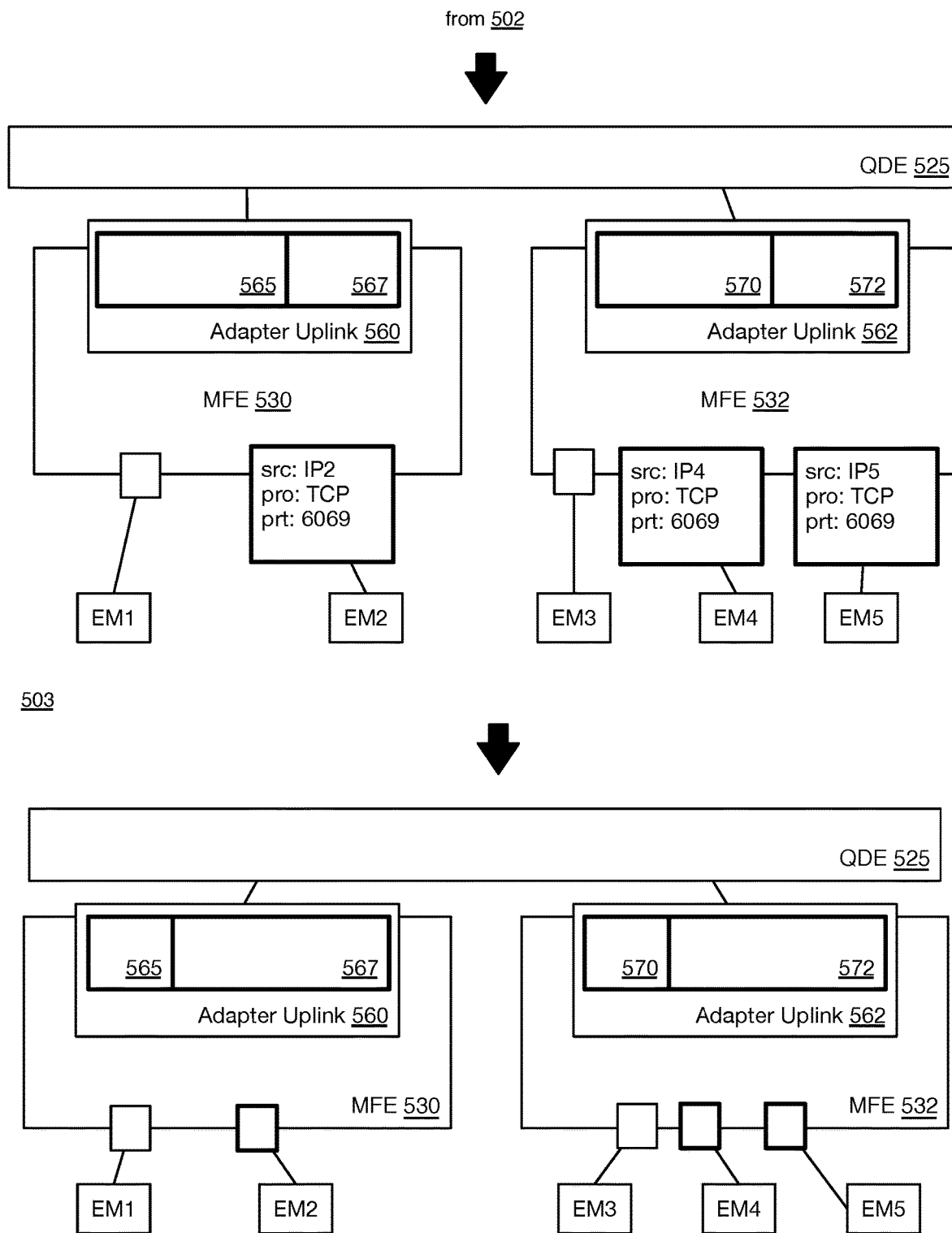

FIGS. 5A-B illustrate an example of deploying policy driven QoS in a network in four stages 501-504. This figure shows QDE 525 with DVSs 530 and 532, which are coupled to end machines EMs 1-4. End machines of different embodiments include virtual machines (VMs) coupled to software forwarding elements (e.g., virtual switches) on host machines and/or physical machines (e.g., servers) coupled to physical forwarding elements (e.g., top of rack switches, routers, etc.).

In the first stage 501, the QDE shows the tables 410-430 of a policy framework, as described above with reference to FIG. 4. In this example, the second example (i.e., assigning physical adapter shares for ERP traffic from machines with users from the Finance group), based on the second record of each table, is being applied. QDE 525 (through a rule generator) identifies the corresponding records (shown as bold) for the QoS policy rule from policy framework 510. The different records for the second example are described above with reference to FIG. 4.

In some embodiments, the process for deploying dynamic policy driven QoS is based on the occurrence of events, as detected by a monitoring engine of the QDE 525. In some embodiments, the events are triggered based on administrative changes (e.g., when the QoS policy rules are changed, security groups are updated, etc.) or on network changes (e.g., when a VM is relocated between host machines in a network, a new user logs into a machine, etc.). In this example, an administrator has updated the QoS policy to change the number of shares assigned to the port group for the Finance group from 75 to 150, doubling the portion of the available bandwidth to be used for ports with machines at which Finance users are logged in.

QDE 525 then evaluates the QoS policy rule and identifies memberships of the different security groups (e.g., using a translation service API). The second stage 502 shows that QDE 525 identifies corresponding machines (EM2, EM4, and EM5) from the group framework 520 for the finance group (identified for the QoS policy rule in table 512 of the policy framework 510). Group framework 520 shows that finance users are logged into EMs 2, 4, and 5, which correspond to port 2 at MFE 530 and ports 2 and 3 at MFE 532 respectively. From the group framework, QDE 525 identifies additional information (e.g., virtual network interfaces (vNICs), an associated port at a MFE, network addresses, etc.) related to the end machines that are identified as members of the relevant security groups. In the second stage 502, the ports for the selected finance group have been identified (shown as bold) based on information from the group framework 520.

QDE 525 of some embodiments configures the QoS policies at MFEs associated with the identified machines. In some embodiments, QDE 525 configures the MFEs to provide various QoS functions (e.g., guaranteed throughput, enforce bandwidth limits, minimize latency, etc.) based on the traffic and dynamic filters for the QoS policy rules.

In this example, the identified machines EM2, EM4, and EM5 are connected to the identified ports at MFEs 530 and 532. QDE 525 of some embodiments configures the identified ports by setting filters (e.g., source/destination addresses, app workload, etc.) at the ports to apply different QoS operations to a matching set of network traffic. The filters of some embodiments are generated by QDE 525 based on other factors (e.g., logged in users, time of day, security group membership, etc.).

In some embodiments, QDE 525 configures (e.g., using an API) the MFEs 530 and 532 to send the traffic matching the filters to different queues, providing different levels of service to different types of traffic. QDE 525 of some embodiments configures the MFEs by assigning different ports to different port groups, which are assigned to network resource pools that partition the available bandwidth of a physical adapter. In some embodiments, QDE 525 configures the MFEs by creating/removing network resource pools, reallocating physical adapter shares between the network resource pools, etc.

In the third stage 503, QDE 525 has updated the QoS policies at each of the identified ports. The first identified port, associated with EM2, shows a filter for a source address IP2, a protocol TCP, and a port 6069. The filter identifies the ERP traffic that originates from EM2. Similar filters are applied at the ports for EM4 and EM5. The source addresses for the filters at EM4 and EM5 are customized to identify the corresponding source addresses.

The third stage 503 also shows network resource pools 565-567 of adapter uplink 560 of MFE 530. MFE 532 shows network resource pools 570-572 of adapter uplink 562. In some embodiments, adapter uplink represents a connection (e.g., a port) between a software MFE and a physical adapter (not shown) of a host machine.

In this example, the network resource pools are used to divide the available bandwidth of the physical adapters 560 and 562 based on QoS policies that have assigned different numbers of physical adapter shares to the different network resource pools. Specifically, network resource pools 567 and 572 represent network resource pools for the ERP traffic from the finance group, while network resource pools 565 and 570 represent network resource pools for other traffic on the machine. In the third stage 503, network resource pools 565 and 570 have been assigned a greater number of shares than network resource pools 567 and 572.

Finally, the fourth stage 504 shows that QDE 425 has updated the bandwidth distribution for the physical adapters 560 and 562, increasing the available bandwidth for network resource pools 567 and 572 for ERP traffic from the finance group (i.e., traffic from EMs 2, 4, and 5).

Figure 6A:
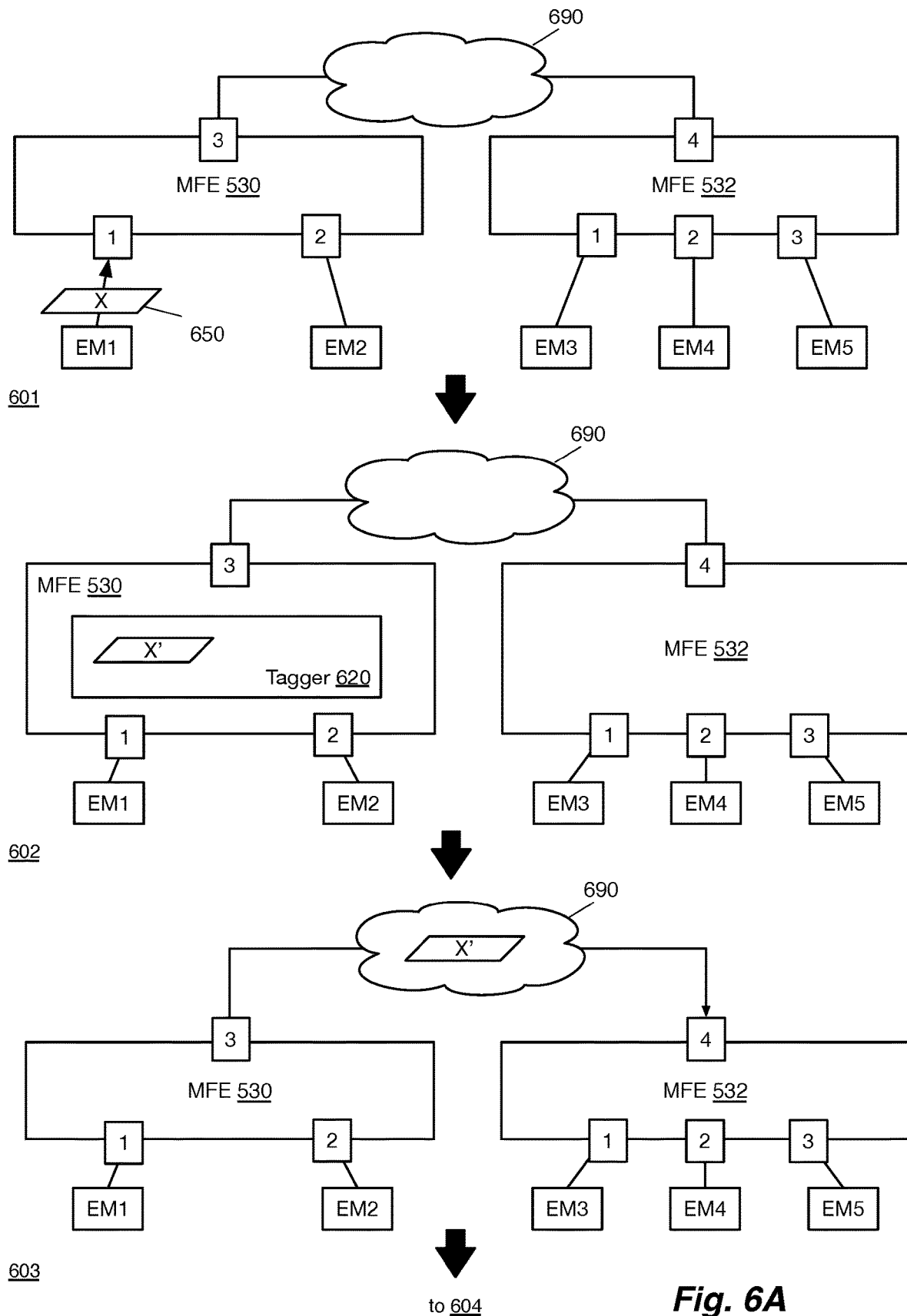
FIGS. 6A-B illustrate an example of implementing QoS policies for traffic in a network.
Figure 6B:
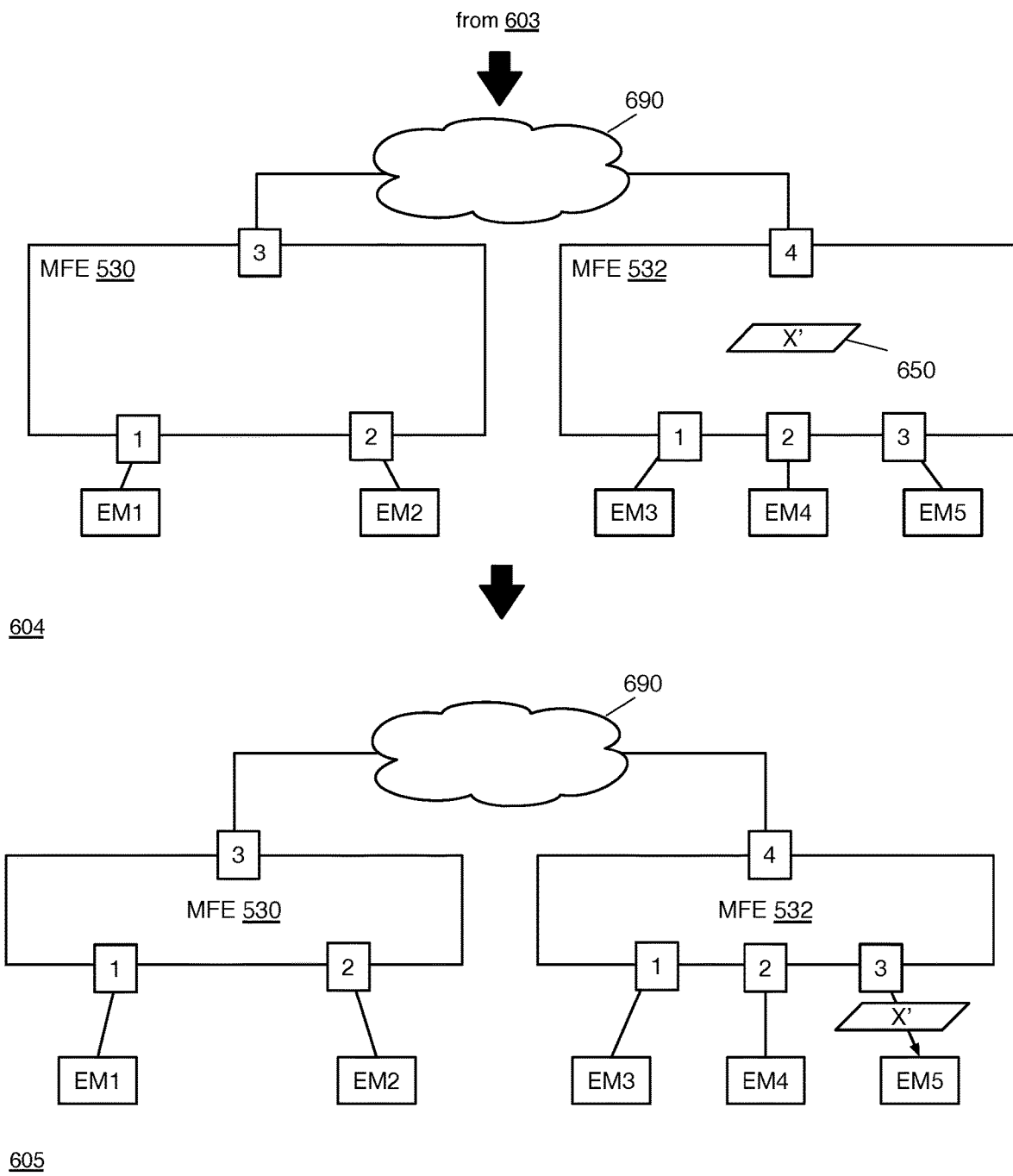

FIGS. 6A-B illustrate an example of implementing QoS policies for traffic in a network in five stages 601-605. The example of this figure shows two MFEs 530 and 532 with ports 1-3 and 1-4 respectively. Ports 1 and 2 of MFE 530 are coupled to end machines EM1 and EM2. Ports 1-3 of MFE 532 are coupled to end machines EM3-EM5. The MFEs are coupled to each other through port 3 of MFE 530 and port 4 of MFE 532 via a network 690.

The first stage 601 shows that VM1 sends a packet 650 with value X to port 1 of MFE 530. The value X represents all the contents (e.g., header values, payload, etc.) of the packet. Based on the rules configured for the port, performs various QoS operations. In the second stage 602, tagger 620 tags the packet 650 with QoS tag values (indicated as X') according to the QoS policies defined for port 1. The QoS tag values (e.g., CoS tag values, DSCP tag values, etc.) facilitate the enforcement of the QoS policies as packet 650 travels through the network 690 toward its destination.

In the third stage 603, packet 650 is passed through network 690. The packet 650 is marked with QoS tags that are understood by other forwarding elements in the network 690 that are not directly managed within a local network (e.g., a datacenter). The QoS tags are used to apply different QoS operations (e.g., traffic shaping, minimum guaranteed throughput, latency requirements, etc.) to the packet as it passes through network 690. In the fourth stage 604, destination MFE 532 receives the packet 650 and sends (in the fifth stage 605) packet 650 to the destination VM 5.

Figure 7:
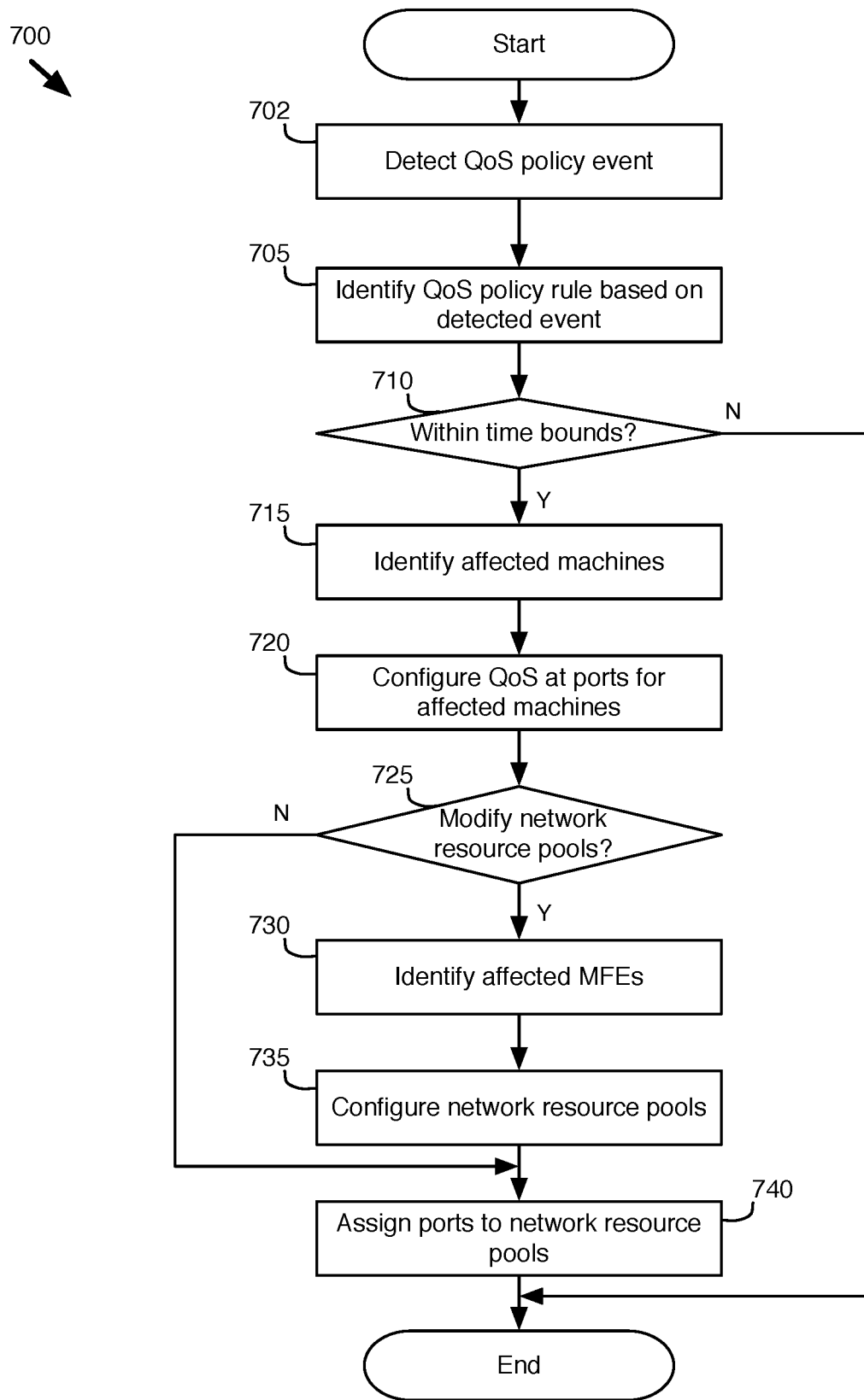
FIG. 7 conceptually illustrates a process for deploying policy driven quality of service in a network.

FIG. 7 conceptually illustrates a process for deploying policy driven quality of service in a network. The process 700 detects (at 702) a QoS policy event. A QoS policy event can be any event that affects the implementation of QoS policies in the network. QoS policy events can be based on QoS policy changes, security group changes, network changes, etc.

When the process 700 detects (at 702) a QoS policy event, the process 700 identifies (at 705) a corresponding QoS policy rule to be applied. The corresponding QoS policy rule may include any rule that is affected by changes in security groups, by the login of a user, the creation of a new VM, etc.

The process 700 then determines (at 710) whether a current time is within a specified time range for the QoS policy rule. Some QoS policy rules are only implemented during particular times (e.g., at night, on weekends, once monthly, etc.). The identified QoS policy rule of some embodiments does not specify a time range (e.g., "Any") to indicate that the QoS policy rule is always active. When process 700 determines (at 710) that the current time is not within the specified time range, the process 700 ends.

When the process 700 determines (at 710) that it is within the time bounds (or when no time bounds are specified), the process 700 identifies (at 715) the affected machines for the identified QoS policy rule. The affected machines of some embodiments include machines in the security group or along a path between a set of machines, etc. In some embodiments, the group of machines are all machines associated with a logical forwarding element of a logical network.

The process 700 then configures (at 720) QoS at ports associated with the affected machines by setting up packet marking policies, setting traffic filters to provide differentiated services, etc. In some embodiments, the process 700 uses an API to configure the QoS policies at various MFEs for the affected machines.

At 725, the process 700 then determines whether it is necessary to modify the network resource pools of a MFE in order to implement the identified QoS rule. When the process determines that such modification is not necessary, the process 700 continues to step 740, described below.

When the process 700 determines (at 725) that the network resource pools need to be modified, the process 700 identifies (at 730) affected MFEs and configures (at 735) the network resource pools of the affected distributed virtual switches. In some embodiments, the process 700 configures (at 735) the MFEs for QoS by creating and allocating physical adapter shares for network resource pools, assigning ports to port groups associated with the network resource pools, etc.

Finally, the process 700 of some embodiments assigns (at 740) the ports for the affected machines to the network resource pools at the corresponding MFEs. The filtered traffic for the different ports will use the allocated bandwidth of the network resource pools according to the enforced QoS policy rules. The process 700 then ends.

The QDE of some embodiments deploys policy driven QoS in a network. Policy driven QoS allows for a centralized, efficient, and dynamic system to implement QoS at multiple points in a network that responds to various changes in the network.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
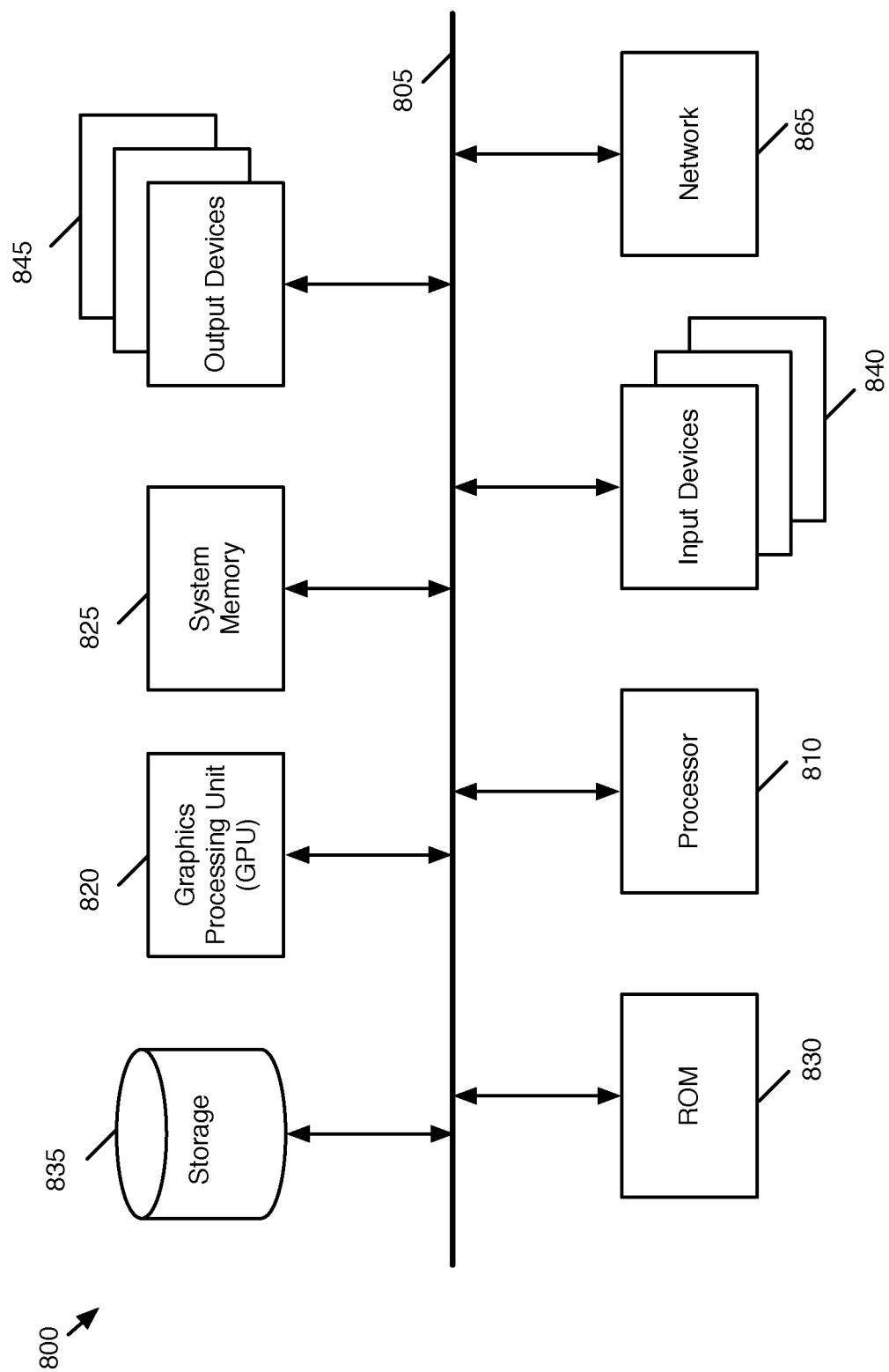
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for implementing quality of service (QoS) for a plurality of machines of a network, the method comprising:
   in response to a detected network event, identifying a QoS policy that needs to be implemented;
   dynamically identifying a set of machines that meet a set of criteria associated with the QoS policy; and
   configuring a set of managed forwarding elements of the network to provide a QoS guarantee of the identified QoS policy while forwarding traffic associated with the set of machines.

2. The method of claim 1, wherein the identified QoS policy is expressed in terms of a rule that comprises a match portion with a filter and a time range value to identify a set of traffic to which the QoS policy is applicable.

3. The method of claim 2, wherein identifying the QoS policy comprises determining that a current time is within the time range value.

4. The method of claim 2, wherein the filter of the match portion filters on at least one of (i) a source address, (ii) a destination address, (iii) a protocol, and (iv) a port value.

5. The method of claim 1, wherein dynamically identifying the set of machines comprises:
   identifying a set of security groups associated with the QoS policy; and
   classifying machines that belong to at least one security group of the set of security groups as belonging to the set of machines.

6. The method of claim 5, wherein the set of security groups identifies a set of users, wherein a particular machine is identified as a part of the set of security groups when a user of the set of users is logged into the particular machine.

7. The method of claim 5, wherein the set of security groups identifies an operating system, wherein a particular machine is identified as a part of the set of security groups when the particular machine executes the identified operating system.

8. The method of claim 1, wherein configuring the set of managed forwarding elements comprises configuring ports of the managed forwarding elements to which the machines connect to reallocate available bandwidth for the traffic associated with the set of machines.

9. The method of claim 8, wherein configuring the ports to reallocate available bandwidth comprises setting a minimum throughput for traffic sent to or from the ports.

10. The method of claim 1, wherein configuring the set of managed forwarding elements comprises assigning a set of ports of the managed forwarding elements to a particular network resource pool.

11. The method of claim 1, wherein configuring the set of managed forwarding elements comprises:
    creating a set of network resource pools that manage the bandwidth usage of ports assigned to each network resource pool; and
    assigning ports by which the set of machines connect to the set of managed forwarding elements to the set of network resource pools.

12. The method of claim 1, wherein configuring the set of managed forwarding elements comprises configuring the managed forwarding elements to modify header fields for traffic to which the QoS policy is applicable.

13. The method of claim 1, wherein the set of machines include a plurality of machines executing on a plurality of host computers, and the set of managed forwarding elements include a plurality of managed forwarding elements that execute on the plurality of host computers.

14. The method of claim 13, wherein the detected event is at least one of a user login event at a particular machine of the plurality of machines and the addition of a new machine to the network.

15. The method of claim 1, wherein the QoS guarantee comprises at least one of (i) a guarantee with respect to the managed forwarding element set's throughput of the traffic associated with the set of machines, (ii) a guarantee with respects to the managed forwarding element set enforcing bandwidth limits while forwarding the traffic associated with the set of machines, and (iii) a guarantee with respects to the managed forwarding element set minimizing latency while forwarding the traffic associated with the set of machines.

16. A non-transitory machine readable medium storing a program which when executed by at least one processing unit implements quality of service (QoS) for a plurality of machines of a network, the program comprising sets of instructions for:
    in response to a detected network event, identifying a QoS policy that needs to be implemented;
    dynamically identifying a set of machines that meet a set of criteria associated with the QoS policy; and
    configuring a set of managed forwarding elements of the network to implement the QoS policy for network traffic associated with the set of machines.

17. The non-transitory machine readable medium of claim 16, wherein the identified QoS policy is expressed in terms of a rule that comprises a match portion with a filter and a time range value to identify a set of network traffic to which the QoS policy is applicable.

18. The non-transitory machine readable medium of claim 16, wherein identifying the QoS policy comprises determining that a current time is within the time range value, and the filter of the match portion filters on at least one of (i) a source address, (ii) a destination address, (iii) a protocol, and (iv) a port value.

19. The non-transitory machine readable medium of claim 16, wherein the set of instructions for dynamically identifying the set of machines comprises sets of instructions for:
   identifying a set of security groups associated with the QoS policy rule; and
   classifying machines that belong to at least one security group of the set of security groups as belonging to the set of machines.

20. The non-transitory machine readable medium of claim 16, wherein the set of instructions for configuring the set of managed forwarding elements comprises a set of instructions for configuring ports of the managed forwarding elements to which the machines connect to reallocate available bandwidth for the network traffic associated with the set of machines.

21. The non-transitory machine readable medium of claim 20, wherein the set of instructions for configuring the ports to reallocate available bandwidth comprises a set of instructions for setting a minimum throughput for network traffic sent to or from the port.

* * * * *